March 29, 1966 A. LIBERMAN 3,243,512

INTERCOMMUNICATION SYSTEM

Original Filed Oct. 6, 1960 3 Sheets-Sheet 1

Inventor.
Arie Liberman
By Hofgren, Brady,
Wegner, Allen & Stellman
Attorneys

United States Patent Office 3,243,512

Patented Mar. 29, 1966

3,243,512

INTERCOMMUNICATION SYSTEM

Arie Liberman, Skokie, Ill. (% Talk-A-Phone Co., 5013 N. Kedzie Ave., Chicago, Ill.)

Continuation of application Ser. No. 60,884, Oct. 6, 1960. This application Mar. 1, 1965, Ser. No. 446,756
10 Claims. (Cl. 179—1)

This application is a continuation of my application Serial No. 60,884, filed October 6, 1960, now abandoned.

This invention is concerned with an intercommunication system, and more particularly with an improved intercommunication system utilizing various types of stations connectable to provide different types of service.

In an intercommunication system embodying the invention, the stations may be designated as "master" and "staff" stations. A master station may initiate a call to any of the various stations in the system, while a staff station can initiate calls to only a limited number of master stations. In each master station, an amplifier may be provided for amplifying the electrical signals which are coupled between the stations. Furthermore, the various stations may be connected for private or non-private communication with each other. A non-private station may be monitored by another station, i.e., any conversations at the non-private station are picked up and broadcast at the other station, without action at the non-private station. At a private station, the condition selector switch must be operated to effect transmission. This background information regarding the nature of the system and of the different stations and types of operation which are provided will be expanded in the following detailed description.

The invention is particularly concerned with novel signaling and power supply circuitry providing for efficient utilization of the intercommunication stations and for a maximum variety of services with minimum equipment.

One feature of the invention is the provision in an intercommunication system of a plurality of stations each having an electro-acoustical transducer, a source of power in the system, conductor means interconnecting the stations, selector switch means in one of the stations for initiating a call to another station, means in the called station for indicating reception of a call, and circuit means including the selector switch means and the conductor means, interconnecting the indicating means in the other station with the power source upon actuation of the selector switch means in the one station.

Another feature is the provision of a "busy" indicator in the first mentioned or calling station, an energization circuit for which it is completed through a switch means in the other or called station and provides a signal indicating that the called station is busy, if this is the case. The same signal means, as a lamp, is energized at a station when it is called by another, providing an indication that the conversation is being monitored.

A further feature is the provision in an intercommunication system of a plurality of intercommunication stations connected together with conductors, a power supply in at least certain of the stations, and means interconnecting the power supplies whereby the power supply in one station may provide power for another station. This is particularly important where the stations each utilize an amplifier which must be energized from a power supply that is connected with an external power source. Some stations may be located at points where external power is not readily available and the provision of an interconnection between the power supplies permits the amplifier in one station to operate from the power supply in another where this is desirable.

Still another feature is the provision of a station having an amplifier, a power supply for the amplifier, means connected with the power supply and amplifier rendering the power supply ineffective to operate the amplifier, selector switch means in the station, and means responsive to actuation of the selector switch means for rendering the connection between the power supply and amplifier effective. Yet a further feature is that means are provided in another station connected with such station and requiring utilization of the amplifier in the station, to render the connection between the amplifier and power supply operative.

Under certain circumstances, as will appear, noise is coupled through a portion of the amplifier of the system. Another feature of the invention is the provision of a novel amplifier circuit which renders the amplifier inoperative under such conditions.

Further features and advantages of the invention will readily be apparent from the following specification and from the drawings, of which:

Intercommunication systems are widely used in business establishments, stores, industry and the like to provide communication between various points. The wide use of such systems has created a demand for many different types of services, and for flexible systems which may be used in various ways and in all manner of locations regardless of availability of electrical power, or the noise level which may be encountered. For example, a single system may include stations located in executive offices and in manufacturing areas. The type of service needed at one location is often much different from that required in another location. The system disclosed and claimed herein provides a wide variety of types of service together with maximum flexibility and a minimum of different types of equipment.

Figure 1:
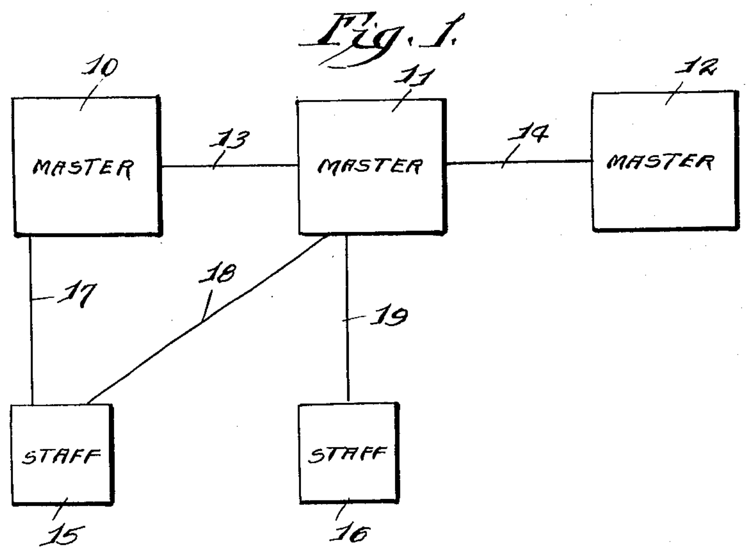
FIGURE 1 is a block diagram of an intercommunication system embodying the invention.

Turning now to the drawings, FIGURE 1 illustrates in block form the basic elements which may be utilized in such a system. Master stations 10, 11 and 12 are interconnected by cable sections 13 and 14. The specific nature of these cable interconnections will be detailed below. Staff stations 15 and 16 are provided, with staff station 15 connected to master station 10 by cable section 17 to master station 11 by cable section 18. Staff station 16 is connected only to master station 11, by cable section 19. In this system, each of the master stations may initiate a call to any other master station and to either of the staff stations. Staff station 15 may initiate a call to either of the master stations 10 and 11 to which it is connected, while staff station 16 may initiate a call only to master station 11. Each station includes a two-way electro-acoustical transducer which serves both as a microphone and loudspeaker, together with suitable selector switch means for controlling the operation of the station and its interconnection with other stations. Each master station is provided with an amplifier which serves to amplify the electrical signals which are transmitted between stations.

Figure 2:
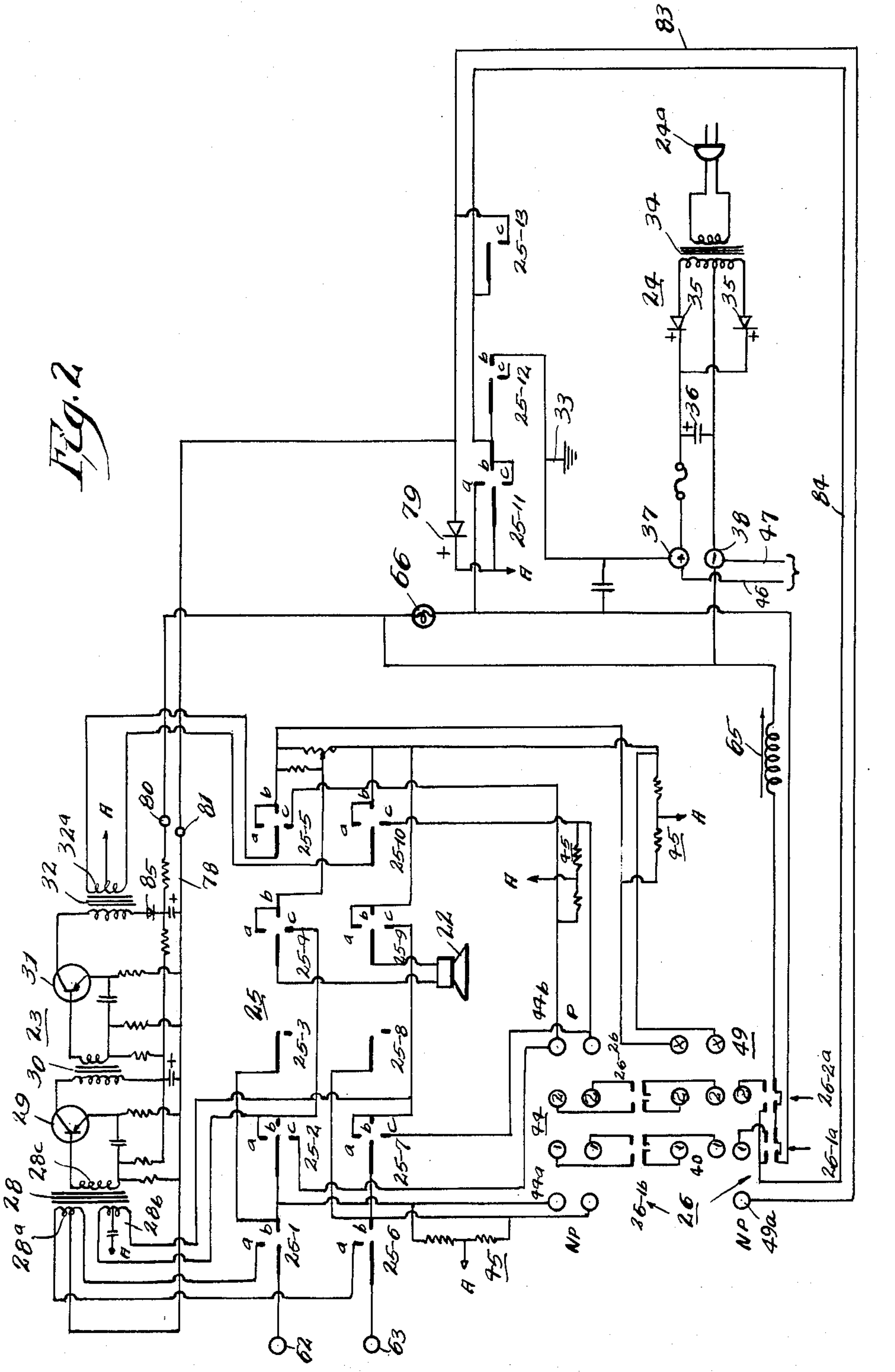
FIGURE 2 is a schematic circuit diagram of a master station embodying the invention.

Turning now to FIGURE 2, the circuit components and operation of a master station will be described in more detail. The major elements of the station include electro-acoustical transducer 22, amplifier 23, power supply 24, multi-section condition selector switch means 25 and station selector switch means 26.

Electro-acoustical transducer 22 serves as both the microphone and loudspeaker for the station and is connected variously to the input or output of amplifier 23, or to incoming cable terminals, through the condition and station selector switch means 25 and 26 as will appear.

Amplifier 23 includes an input transformer 28 having a pair of primary windings 28*a* and 28*b*, and a secondary winding 28*c* which is connected to the input of the transistor amplifier 29. The output of amplifier 29 is coupled through transformer 30 to power amplifier stage 31, the output of which is developed in transformer 32. The center taps of transformer windings 28*b* and 32*a* are returned to a common point A, which appears at several other places in the circuit. As will be explained in more detail below, the point A is, under certain circumstances, returned to a reference potential or ground 33.

Power supply 24 is energized from a suitable source, as 110 volts A.C. (not shown), connector 24*a* and step-down power transformer 34 connected in a full wave rectifier circuit comprising rectifiers 35 and a filter capacitor 36. A suitable direct current potential is present at power supply output terminals 37 and 38 for operating amplifier 23 and certain other elements of the system.

Station condition selector switch 25 shown herein is provided with thirteen sections indicated as 25–1 through 25–13. The selector switch means has three positions, indicated as *a*, *b*, and *c*, although not each section makes a contact in each position. The "*a*" position of condition selector switch 25 corresponds with a "stand-by" condition of the station; switch position "*b*" corresponds with a "listen" condition; and position "*c*" with a "talk" condition. The various sections of the condition selector switch effectuate interconnection of electroacoustical transducer 22 with amplifier 23 and with the various cable terminals, and also control connections of the power supply 24 with amplifier 23 and with various indicator and signaling devices.

The primary cables between stations are connected with a series of pairs of terminals 40, which are identified by assigning each pair with a number corresponding with the number assigned to the station in the system. All of the like numbered terminals in the system are connected together, thus the terminals 1 in each of the stations are connected together, with the exception of the No. 1 station. In this station, the cable pair assigned to No. 1 is connected with terminals X—X. Similarly, in station No. 2 the cable pair assigned No. 2 is connected with terminals X—X. The cable terminal pairs 40 are connectable through station selector switch contacts 26–1*b* and 26–2*b* to a further set of terminal pairs 44, each pair again being designated by numbers representing the respective station numbers. The terminal pairs 44 are selectively connectable, as by jumper wires, with "non-private" terminal pairs 44*a* or "private" terminal pairs 44*b*, and the connection which is made determines the nature of the relationship between the respective stations. The principal difference is that with a "non-private" relationship one station may listen in on another, while with a "private" relationship, the operator must actuate a switch for the conversation at the station to be transmitted. Connected across each terminal pair 44*a*, 44*b*, and terminals X—X are resistive cable termination networks 45 with a center tap returned to common junction A.

In addition to the cable pairs interconnecting the terminals 40 of the various stations, a connection is made between the power supply output terminals 37 and 38, as through a pair of conductors 46 and 47 to the corresponding power supply terminals in each of the other master stations. If one of the master station is located in an area where an external power source to which the connector 24*a* would be connected is unavailable, power is coupled through the connection 46–47 to operate the amplifier and signaling devices as required from the other stations in which the power supplies are energized. As the amplifiers used in the system utilize low-current drain transistors, the current flow through the interconnecting power conductor pair 46 and 47 is generally rather small and the power loss in the conductors is not excessive, nor are power supplies 24 of extremely large capacity required.

Station selector switch sections 26–1*a* and 26–2*a* are connected in the signaling circuitry of the system. Each is actuated from the position shown upon selection of a station, at the same time that switch sections 26–1*b* and 26–2*b* made connection between terminals 40 and 44. Where a particular station is connected for non-private operation, as described above, a jumper is also connected from the corresponding terminal of terminal set 49 to non-private terminal 49*a*.

The modified master station of FIGURE 3 differs from that of FIGURE 2 primarily in the addition of a further amplifier 50, which will be described in detail below. Insofar as the other circuitry of the two units is the same, like reference numerals with the addition of a prime mark (′) will be utilized in FIGURE 3. In most cases, elements and operation described in connection with FIGURE 2 will not be redescribed in detail in connection with FIGURE 3.

Figure 4:
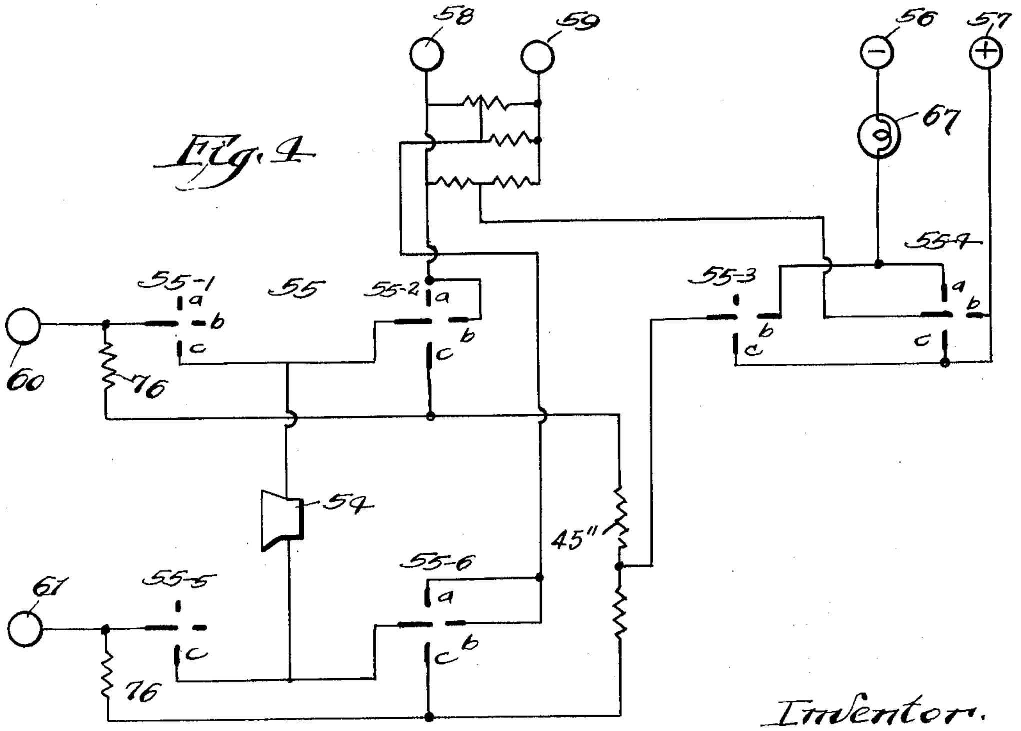
FIGURE 4 is a schematic circuit diagram of a staff station.

The circuit of the staff station is shown in schematic form in FIGURE 4. The station includes an electro-acoustical transducer 54, a three-position multiple section condition selector switch 55 having sections designated 55–1 to 55–6. As in the master station, the condition selector switch has three positions: a "stand-by" position with contacts designated "*a*," a "listen" position with contacts designated with "*b*" and "talk" position with contacts designated with "*c*." Terminals 56 and 57 are connected with the output terminals of 38 and 37, respectively, of one of the power supplies of a master station. Terminals 58 and 59 are connected through a cable pair with the numbered terminals of a master station corresponding with the number assigned to the staff station and are utilized in carrying on a conversation initiated by a master station which is calling the staff. Terminals 60 and 61 are connected through a suitable cable pair with terminals designated 62 and 63 in the master station of FIGURE 2, and are utilized in initiating a call from the staff to the master, as may be done by staff station 16 to master station 11 in FIGURE 1. Where a staff station may initiate calls to two master stations, as staff 15 in FIGURE 1, two condition selector switches are provided.

Each master station includes two signaling means, an audible signal as a chime 65 and a visual signal as lamp 66. The chime 65 is utilized in the circuit disclosed herein to alert a party at a called station that a call is coming in. The lamp 66 serves a dual function: as an indication that the station is being monitored by another station; and during initiation of a call to show that the station to which a call is directed is busy. In the staff station of FIGURE 4, visual signal lamp 67 is provided, also serving a dual function of a monitor and a busy indication.

The operation of the various stations during the conduct of a conversation will now be described in detail. Consider first a system utilizing two master stations, both connected for private operation, one of which wishes to initiate a call to the other. Assume that the master station shown in FIGURE 2 is the calling station and that in FIGURE 3 is the called station and that the condition selector switch means 25 and 25′ of the two stations are in the stand-by (*a*) position. The operator of the calling station actuates the station selector switch corresponding with the station number of the called station. Assuming that the called station is No. 2, the station selector control switches 26–2*a* and 26–2*b* are moved to their actuated positions. Switch 26–2*b* connects the cable pair of the called station (which is connected with terminals X—X at the called station) with the private terminals 44*b* of the calling station. As the called station is not in use, a busy signal is not received at the calling station and the operator of the calling station actuates condition selector switch 25 from the "stand-by" (*a*) position past the "listen" (*b*) position to the "talk" (*c*) position. As the condition selector switch means 25 passes the listen position, a circuit is completed through contacts 25–11*b* and 25–12*b* connecting the common point A with ground 33. This effectively grounds the center taps of each of the line termination networks 45. In the called master station (FIGURE 3), the cable pair selected in the calling station is connected with terminals X—X and actuation of the condition selector switch 25 in the calling station connects point A of the calling station with common junction A′ in the called station through the interconnecting cables and the networks 45 and 45′. The incoming call indicator 65′ in the called station is energized from the power supply 24 of the calling station through this circuit. In the called station, the common point A′ is connected through condition selector switch contact 25–11*a′*, conductor 72′, station selector switches 26–1*a′* and 26–2*a′*, and returned to the negative power supply terminal 38′. This signal alerts the person at the called station that a call is coming in.

In the "talk" position of switch 25, the transducer 22 of the calling station is connected through contacts 25–4*c* and 25–9*c* with primary winding 28*b* of amplifier input transformer 28. The output of amplifier 23 is connected through switch contacts 25–5*c* and 25–10*c* with "private" terminals 44*b* and through contacts 25–2*c* and 25–7*c* with "non-private" terminals 44*a*. Thus, regardless of the nature of the connection of the stations, the output of the amplifier is connected with the cable pair of the called station. At the called station, where this cable pair is connected to terminals X—X, the incoming amplified signal is connected through a volume control 74′ and selector switch contacts 25–4*a′* and 25–9*a′* to the transducer 22′. Condition selector switch 25 of the calling station is turned to the "listen" (*b*) position to await a reply. In the called station, the operator actuates the station selector switch corresponding with the calling station and then actuates condition selector switch 25′ to the "talk" (*c*) position and replies. Conversation may then be carried on with the operators alternately operating the condition selector switches at their respective stations between "talk" and "listen" positions.

If the called station is busy at the time another call is initiated to it, the busy indicator in the calling station is energized in the following manner. With the called station in use, the condition selector switch 25′ is in either the "listen" or "talk" position and the common point A′ is returned to ground 33′. Upon actuation of station selector switch in the calling station, the circuit from lamp 66 is completed through switch contact 25–11*a*, common point A, line termination networks 45, the selected station selector switch as 26–2*b*, the interconnecting cable, terminals X—X of called station, network 45′, common junction A′ in the called station, condition selector switch sections 25–11*b′* and 25–12*b′* or 25–11*c′* and 25–12*c′*, depending on whether the called station is listening or talking, to ground. When the busy light appears upon selection of a desired station, the calling operator should release the station selector switch and wait until later. If the call is urgent, conversation at the other station may be overridden by merely actuating the condition selector switch 25 to the "talk" position and speaking.

The situation described above is for that of one private master calling another. If a private master calls a non-private master, the non-private master may reply with his condition selector switch remaining in the "stand-by" position, as the answering signal is received in the calling station at terminals 44*a* and connected through switch contacts 25–2*b* and 25–7*b* to winding 28*b* of the amplifier input transformer with condition selector switch 25 in the listen position. Furthermore, in this position of switch 25 the output of amplifier 23 is connected through contacts 25–5*b*, 25–10*b*, and 25–4*b*, 25–9*b* to transducer 22.

A further variation in operation is found if a non-private master calls a private master. Here the called (private) station actuates the station selector switch corresponding with the calling station member and then controls the conversation by actuating condition selector switch 25′. The non-private calling station returns condition selector switch 25 to the stand-by position after announcing his station number. The conversation may then proceed in the manner described in the paragraph above.

The operation of the system for a call from a master to staff station will next be considered, assuming that the staff station condition selector switch 55 is in the "stand-by" (*a*) position. When a master station selector switch corresponding with the staff station is actuated, the cable connected with terminals 58 and 59 in the staff station is connected through switch section 26*b* in the master with the appropriate terminal pair 44. The operator of the calling master station next actuates condition selector switch 25 to the "talk" position in which common junction A is returned to ground 33 and the plus terminal 37 of the power supply through sections 25–11 and 25–12 of the condition selector switch. A circuit is completed through the cable and staff condition selector switch contact 55–4*a* energizing lamp 67 which alerts the operator of the staff station that a call is coming. At the staff station, condition selector switch 55 is left in the "stand-by" position and the conversation is carried on with the operator of the calling master station controlling the circuit connections through actuation of condition selector switch 25, where the staff is connected for non-private operation with the master.

If the staff is connected for private operation, reply must be made by actuating the staff condition selector switch 55 between the "listen" (*b*) position and "talk" (*c*) position. In the listen position, the incoming signal from the calling master station is connected through cable terminals 58 and 59 switch contacts 55–2*b* and 55–6*b* to transducer 54. In the "talk" position, the output of transducer 54 at the staff station is connected through contacts 55–1*c* and 55–5*c* with terminals 60 and 61 which, as pointed out, are connected with terminals 62 and 63 of the master station. The signal coming into the master station on these terminals is connected through contacts 25–1*b* and 25–6*b*, and 25–2*b* and 25–7*b* to the input of amplifier 23.

A staff station initiates a call to one of the master stations to which it may do this, as from staff station 15 to master station 10 or 11 in FIGURE 1, by actuating condition selector switch 55 to the talk position. If the master condition selector switch 25 is in "listen" (*b*) position, a circuit is completed from the negative staff terminal 56 energizing lamp 67 through staff condition selector switch contact 55–3*b*, staff balance network 45″, dropping resistor 76, the cable connected between terminals 60–61 and 62–63, master condition selector switch contacts 25–1*b* and 25–6*b*, master network 45 and common junction A to ground 33 and the positive power supply terminal 37. If the called master is not busy, the positive power supply terminal 57 at the staff is connected through staff condition selector switch contact 55–3*c*, network 45″, resistors 76, the cable between the stations, condition selector switch contacts 25–1*a* and 25–6*a*, the center tap of input transformer primary winding 28*a*, conductor 78, diode 79, master condition selector switch contact 25–11*a*, and station selector switch section 26*a* energizing indicator chime 65 at the master station. The staff operator announces the station number to the called master whereupon the operator of the master station depresses the appropriate station selector switch. In a non-private staff, the operator places condition selector switch 55 in the "stand-by" (*a*) position and continues his conversation without further operation of controls. At a private staff station, condition selector switch 55 must be operated between the "talk" and "listen"

positions during a conversation as must be condition selector switch 25 at the master station.

In the various situations in which one station calls another, the called station indicator lamp, 66 in the master station and 67 in a staff station (which also serves as a "busy" signal when initiating a call), is energized so long as the associated condition selector switch is in the stand-by position, indicating to the operator that any conversation taking place is being monitored or listened to at some other station.

The amplifier 23 is energized from power supply 24 and has one power terminal 80 connected directly with negative terminal 38 of the power supply. The positive amplifier bias terminal 81 is connected through a diode 79 with the common junction point A. With the condition selector switch 25 of the station in the "stand-by" or (*a*) position, amplifier 23 is inoperative. When the master station condition selector switch 25 is actuated to the talk position, amplifier terminal 81 is connected through condition selector switch contacts 25–11*c* and 25–12*c* to positive power supply terminal 37, completing the amplifier energization circuit. When the master is listening to a call from a non-private master or from a non-private staff station, it will be recalled that the corresponding station selector switch as 26–1, is actuated. This completes a circuit from power supply terminal 81 through conductor 83, NP terminal 45*a*, the corresponding station terminal in terminal bank 45, the actuated station selector switch conductor 84 and station condition selector switch 25–12*b* to the positive power supply terminal.

In situations where the master station receives a call that must be amplified, as from a staff station calling in, manipulation of the condition selector switch in the staff station also effectuates actuation of the amplifier in the called station. Referring again to FIGURE 4, it will be seen that in the talk position of the staff condition selector switch 55, a circuit is completed from positive terminal 57 through condition selector switch contact 55–3*c* to the mid-point of network 45″. The cable connected to terminals 60 and 61 is connected directly across the network 45 through condition selector switch contacts 55–1*c*, 55–5*c* and 55–6*c*. The positive potential from terminal 57 is applied through the cable and switch contacts 25–1*a* and 25–6*a* in the master station to the center tap of input transformer primary winding 28*a*, connected directly with amplifier terminal 81.

The power supply sharing arrangement utilized in this system, by virtue of which certain of the master stations need not be connected with an external source of power from which to energize the local amplifier, is commercially practible at least in part because of the above described arrangement by virtue of which the amplifiers are not connected with the associated power supply except when and as used.

When receiving incoming calls on a non-private connection, the master station condition selector switch 25 is in the stand-by position. In this situation, both the incoming and outgoing electrical signals are present at terminals X—X and thus are applied not only to the transducer 22 but to the winding 32*a* of output transformer 32. Although the power supply to the amplifier is not completed in this situation, a portion of the incoming signal from the other station which is applied to the winding 32*a* of the output transformer serves to cause operation of transistor 31 on alternate half cycles, amplifying noise in the system. The inclusion of diode 85 in the collector circuit of this transistor eliminates this problem.

Figure 3:
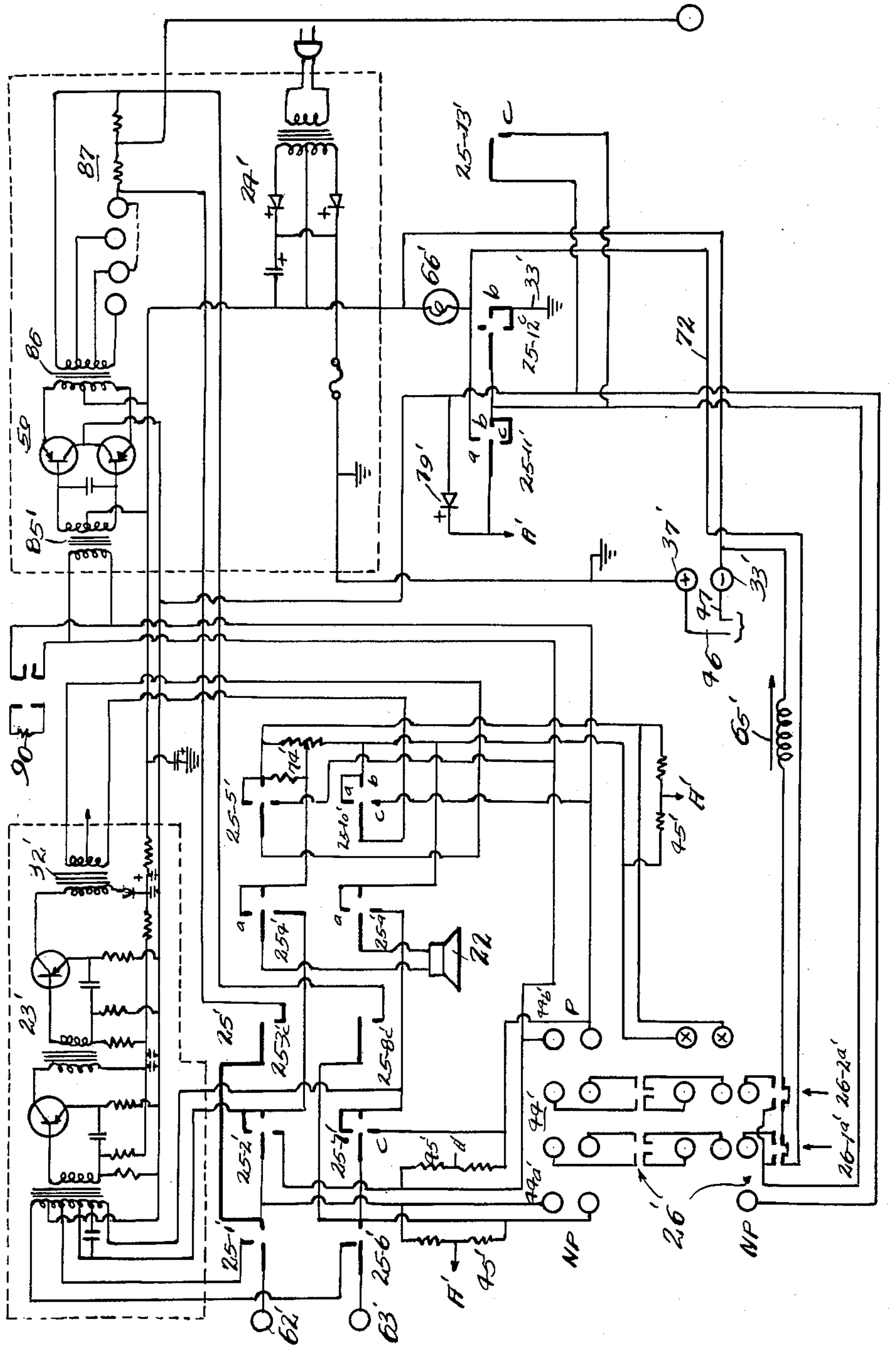
FIGURE 3 is a schematic circuit diagram of a modified master station.

In the modified master circuit of FIGURE 3, the output of amplifier 23′ is connected through transformer 32′ to switch sections 25–5′ and 25–10′ as in FIGURE 2. However, the connections from the "talk" or (*c*) position of these switch sections go not only to terminal pairs 44′, from which they may be connected through suitable actuation of the station selector switch 26′ to other stations, but are also connected with the input transformer 85′ of auxiliary amplifier 50. The output of amplifier 50 is connected through a multi-tap transformer 86 to a balanced output network 87. This amplified signal is connected through condition selector switch contacts 25–3*c′* and 25–8*c′* to NP terminals 44*a′* and through additional switch sections 25–2*c′* and 25–7*c′* to private terminals 44*b′*. This arrangement is particularly useful where a great many stations are called at one time, as in a paging operation, or where a call is made to an extremely noisy location and the additional power is required to overcome the surrounding noise. The tapped secondary of output transformer 86 permits impedance matching to the speaker load. The incoming signals from other stations, even though they may be passed through amplifier 23′ are not coupled to auxiliary amplifier 50 but are connected directly from amplifier 23 through condition selector switch contacts 25–5*a′* or 25–5*b′* and 25–10*a′* or 25–10*b′* to transducer 22′. In the event the gain of amplifier 50 is excessive, and impedance or resistor 90 may be shunted across the primary winding of transformer 85′ to reduce the amplitude of the input signal. Auxiliary amplifier 50, which is preferably a push-pull connected transistor amplifier, is operated substantially at cut-off in the absence of an incoming signal and has an extremely low current drain so that it does not unduly load power supply 24′. With a signal, the amplifier functions in a Class B mode.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In an intercommunication system: a plurality of stations each having an electro-acoustical transducer; a source of power in said system; conductor means interconnecting said stations and including a pair of leads between each station for connecting said transducers; station selector and condition selector switch means in one of said stations, actuable to initiate a call to another station; means in said other station for indicating reception of a call; switch means in said other station, actuated on use of said other station; circuit means including said switch means in said other station and said pair of leads interconnecting said indicating means with said power source upon actuation of the station and condition selector switch means in said one station; a "busy" indicator in said one station; and circuit means, including said pair of leads, the station and condition selector switch means in said one station, and switch means in said other station, actuated during use of the other station to complete an energizing circuit for the "busy" signal in said one station.

2. In an intercommunication system: a plurality of stations each having an electro-acoustical transducer; a source of power in said system; conductor means interconnecting said stations and including a pair of leads between each station for connecting said transducers to carry on a conversation; station selector switch means in one of said stations, actuable to connect with the pair of leads for a selected station; condition selector switch means in each of said stations having stand-by, listen and talk positions, and actuable to establish communication between said one station and said selected station; electrically actuated means in said one station for indicating a call condition; a circuit including the condition selector switch means in said one station, in the stand-by position, and the condition selector switch means in said selected station in the listen and talk positions, connecting said electrically actuated means with said source.

3. The intercommunication system of claim 2 wherein said electrically actuated means includes a visual indicator and an audible indicator, connected in parallel, the circuit of said audible indicator including a portion of said station selector switch means, said switch means portion being open when said station selector switch is actuated to break the circuit for said audible indicator.

4. In an intercommunication system; a plurality of stations, each having an electro-acoustical transducer; a source of power in said system; conductor means interconnecting said stations and including a pair of leads between each station for connecting said transducers; station selector and condition selector switch means in each of said stations, actuable to initiate a call to another station; parallel connected audible and visual means in said stations for indicating reception of a call; and circuit means including the switch means in said call initiating and call receiving stations, and a pair of said leads, interconnecting said indicating means with said power source upon actuation of the station and condition selector switch means in a call initiating station, said circuit means including said station selector switch means in the call receiving station in series with said audible signal means.

5. In an intercommunication system having a plurality of stations, one station including: an amplifier having a power amplifier stage including a transistor; an electro-acoustical transducer; a condition selector switch having a plurality of positions, in one position of which said transducer is connected with the output of said power amplifier stage; interconnecting cables from the others of said stations connected with said transducer; a power supply for said amplifier; a circuit including said condition selector switch connecting said power supply with said amplifier to render the amplifier operative, said last mentioned connection being open in said one position of said condition selector switch; and a diode connected in series with said transistor amplifier, said diode being nonconducting in the absence of the connection of a power supply potential to said amplifier.

6. The amplifier circuit of claim 5 wherein said transistor amplifier includes a transformer having a primary winding connected with the emitter-collector circuit thereof and a secondary winding connected with said transducer and with the interconnecting cables from other stations, the emitter-collector circuit of said transistor having said diode connected therein and poled to conduct only in response to the application of a power supply potential to said amplifier.

7. In an intercommunication system with a plurality of stations, a power control system comprising: an amplifier having power input terminals; a power supply having power output terminals, one of said amplifier power input terminals being connected with one of said power supply output terminals; a diode connected between the other of said amplifier and power supply terminals; a transducer in each of said stations; condition selector switch means in each of said stations and operable to connect said transducer with said amplifier for two-way communication; and means responsive to actuation of said switch means to apply a potential to said diode rendering it conductive and completing the connection between said amplifier and power supply.

8. The intercommunication system of claim 7 wherein the transducers of the stations are interconnected through pairs of conductors which are balanced with respect to a reference potential and actuation of said switch means connects a common reference potential with said conductors rendering said diode conductive.

9. The intercommunication system of claim 8 wherein said reference potential is common throughout said system.

10. In an intercommunication system: a plurality of stations in said system connected together by conductors; power supplies having output terminals in each of a plurality of said stations, each of said power supplies requiring energization from an external power source; an amplifier in each of the stations having a power supply and connected with the output terminals of the associated power supply; and cable means interconnecting said stations and including conductors interconnecting the output terminals of said power supplies for supplying power to stations in which the power supply is not connected with an external power source.

References Cited by the Examiner

UNITED STATES PATENTS

| | | | |
|---|---|---|---|
| 2,892,045 | 6/1959 | Aronson | 330—15 |
| 2,931,986 | 4/1960 | Ensink | 330—15 |
| 3,055,979 | 9/1962 | Shimizu | 179—1 |
| 3,098,122 | 7/1963 | Knauer | 179—1 |

ROBERT H. ROSE, *Primary Examiner.*

J. W. JOHNSON, S. J. BOR, *Assistant Examiners.*